(12) United States Patent
Hoshi

(10) Patent No.: US 6,433,327 B1
(45) Date of Patent: Aug. 13, 2002

(54) NEAR-FIELD OPTICAL MICROSCOPE

(75) Inventor: Hiroaki Hoshi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,992

(22) Filed: Jun. 2, 1999

(30) Foreign Application Priority Data

Jun. 5, 1998 (JP) .......................................... 10-173942

(51) Int. Cl.$^7$ ................................................. H01J 3/14
(52) U.S. Cl. ..................... 250/216; 250/306; 250/201.3
(58) Field of Search ................................ 250/216, 234, 250/227.11, 227.24, 306, 307, 201.3; 356/600, 446; 385/12

(56) References Cited

U.S. PATENT DOCUMENTS

| | | | |
|---|---|---|---|
| 5,294,790 A | * | 3/1994 | Ohta et al. .................. 250/216 |
| 5,450,376 A | | 9/1995 | Matsumura et al. |
| 5,610,897 A | | 3/1997 | Yamamoto et al. |
| 5,739,527 A | * | 4/1998 | Hecht et al. ................. 250/234 |
| 5,789,742 A | * | 8/1998 | Wolff ..................... 250/227.11 |

FOREIGN PATENT DOCUMENTS

JP         3210407    *  9/1991    ................. 250/306

* cited by examiner

Primary Examiner—Que T. Le
Assistant Examiner—Kevin Pyo
(74) Attorney, Agent, or Firm—Fitzpatrick, Cella, Harper & Scinto

(57) ABSTRACT

A near-field optical microscope comprising an optical probe which is arranged in opposition to a sample and irradiates the sample with an evanescent wave, a plurality of photodetectors which detect respective components of light scattered in different directions, among components of the scattered light generated by scattering of the evanescent wave by the sample, and a processor which analyzes characteristics of the sample on the basis of respective detection signals of the plurality of photodetectors.

2 Claims, 2 Drawing Sheets

NEAR-FIELD OPTICAL MICROSCOPE

BACKGROUND OF THE INVENTION

1. Field of the Invention

The present invention relates to a microscope which utilizes near-field optics.

2. Related Background Art

The probe of a near-field optical microscope is mainly constructed of a probe wherein the distal end of an optical fiber is sharpened into a tip, which is covered with a metal film by vapor deposition or the like and then formed with a micro-opening. The optical fiber probe is caused to guide illuminating light, thereby to generate an evanescent wave at the tip micro-opening. When the evanescent wave is brought near to a sample, it is converted into scattered light by the interaction thereof with the sample. The microscopic configuration or structure of the sample, or the material distribution of a microscopic region can be observed by detecting the intensity profile of the scattered light.

The simplest scheme of the probe is a scheme wherein the optical fiber probe for guiding the illuminating light functions also as an optical fiber probe for detecting the scattered light. Herein, the intensity of the scattered light can be detected in such a way that the scattered light picked up at the micro-opening is guided by the optical fiber probe and then split from the entered illuminating light by a semitransparent mirror.

It is known, however, that since the near-field optical microscope in the prior art illuminates the sample and detects the scattered light through the micro-opening, it exhibits low conversion and coupling efficiencies, resulting in feeble light detection, which makes the signal-to-noise ratio (hereinbelow, expressed as "SNR") of the detected light very inferior.

In view of the drawback, there has been proposed a system wherein a sample is placed on the totally reflective surface of a total reflection prism, and wherein scattered light based on the interaction between the sample and an evanescent wave on the totally reflective surface is picked up by the optical fiber probe. It has also been studied to heighten the intensity of the scattered light by raising the intensity of illuminating light for the total reflection prism.

Disadvantageously, however, this system is applicable only to samples each of which can be arranged on the total reflection prism. That is, it has a very narrow range of applications to configurations and materials.

Moreover, the prior-art system cannot distinguish the configuration or structure of the sample from the difference of the materials. In a case, for example, where a minute ruggedness coexists with a minute material difference on a flat surface, the same outputs are produced, and the ruggedness and the material difference cannot be identified.

In this manner, the prior-art examples have had the problems that the SNR is inferior on account of the feeble light detection, that measuring conditions and subjects to-be-measured are limited, and that subjects to-be-measured are further limited because the configuration or structure of the sample cannot be discriminated from the difference of the materials.

SUMMARY OF THE INVENTION

An object of the present invention is to solve the problems of the prior art as stated above, and to provide a near-field optical microscope with which samples to-be-analyzed are not limited, which is less expensive and which is capable of detection of good SNR.

A near-field optical microscope for accomplishing the above object of the present invention comprises an optical probe which is arranged in opposition to a sample, and which irradiates the sample with an evanescent wave; a plurality of photodetectors which detect respective components of light scattered in different directions, among components of the scattered light generated by scattering of the evanescent wave by said sample; and a processor which analyzes characteristics of said sample on the basis of respective detection signals of said plurality of photodetectors.

DESCRIPTION OF THE PREFERRED EMBODIMENTS

Now, the embodiments of the present invention will be described.

Embodiment 1:

The optical detection system of a microscope in Embodiment 1 of the present invention will be described with reference to FIG. 1.

Figure 1:
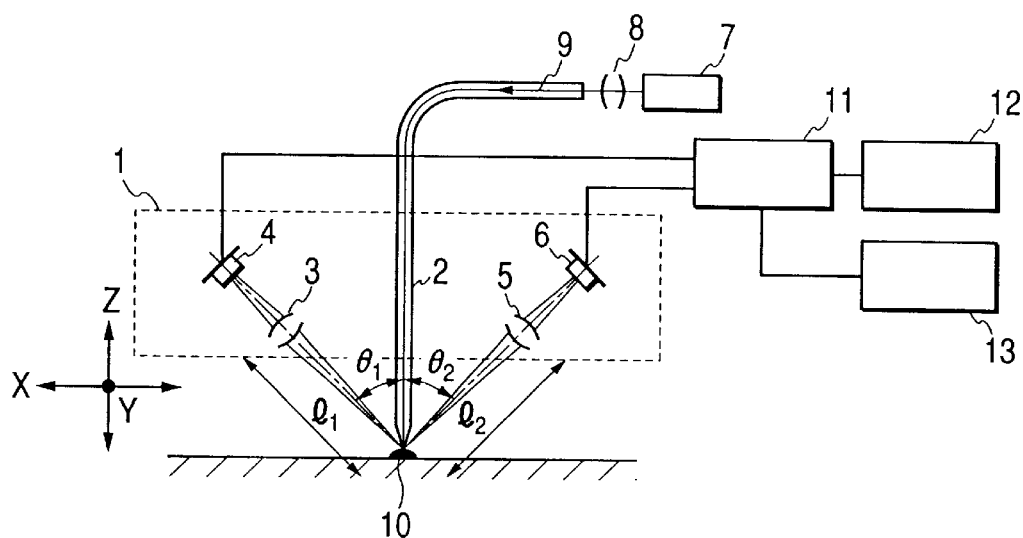
FIG. 1 is a schematic block diagram showing the construction of the first embodiment of the present invention.

FIG. 1 is a schematic block diagram in the case where two photodetectors are arranged.

Referring to the figure, numeral 1 designates an optical head. The optical detection system includes an optical fiber probe 2, light detecting sensor lenses 3 and 5, photodetectors or photosensors 4 and 6, a laser 7, and a collimator lens 8. Numeral 9 indicates illuminating light, and numeral 10 a sample. The microscope includes a processor 11, a memory 12, and an image monitor 13.

A light beam emergent from the laser 7 is coupled with the optical fiber probe 2 by the collimator lens 8, and is guided as the illuminating light 9 inside the probe 2. Part of the illuminating light 9 is converted into an evanescent wave at a micro-opening which is formed at the tip of the optical fiber probe 2.

In this embodiment, the optical fiber probe 2 is set to be substantially perpendicular to the plane of the sample 10 (an XY-plane).

The evanescent wave interacts with the sample 10 in the near-field region of the microscope, thereby to be partly converted into scattered light. The components of the scattered light pass through the sensor lenses 3 and 5 to enter the respectively corresponding photodetectors 4 and 6, in which the light components are photoelectrically converted. The two photodetectors 4 and 6 are set at inclination angles $\theta_1$ and $\theta_2$ relative to a Z-axis within a ZX-plane, and their distances are set at $l_1$ and $l_2$, respectively. Here in this embodiment, the extent of the scattered light which arrives at the photodetectors 4 and 6 is determined by the pupil positions of the sensor lenses 3 and 5. Therefore, the distances $l_1$ and $l_2$ of the respective photodetectors 4 and 6 extend from the tip of the fiber probe 2 to the pupil positions of the correspondent sensor lenses 3 and 5 for picking up the scattered light. The difference between the outputs of the photodetectors 4 and 6 is taken and is subjected to A/D (analog-to-digital) conversion by the processor 11.

The processor 11 stores the difference signals of the photodetectors 4 and 6 in the memory 12 while mapping them in accordance with the outputs of an XYZ-encoder not shown. If necessary, the processor 11 can read out the stored data from the memory 12 and display them on the image monitor 13.

In this embodiment, the two photodetectors 4 and 6 are located at symmetric positions at which both the inclination angles and the distances are equal as $\theta_1=\theta_2$ and $l_1=l_2$.

Owing to such a construction, it is realized to detect the symmetry of the configuration or structure or the material of the sample 10 at a good SNR.

Concretely, it is assumed that the configuration or structure or the material of the sample 10 has a Z-axial symmetry substantially within the ZX-plane. In the case where the probe 2 lies on the symmetry axis (Z-axis), the in-phase components of the element of the configuration or structure or the material are removed, and only the different-phase and antiphase components of the element are differentially detected as the difference signal of the outputs of the two photodetectors 4 and 6 located at the symmetric positions. That is, the superfluous DC (direct current) components in the detection signals of the photodetectors are eliminated, and the AC (alternating current) components can be detected with a doubled amplitude.

In actuality, it may be considered that, with reference to the symmetry of the sample 10, the magnitude of deviation therefrom can be detected. More specifically, while the sample 10 is scanned in an X-direction, the magnitude of deviation is outputted larger at a position remoter from the symmetry axis. In case of a smaller output, it can be judged that the fiber probe 2 lies nearer to the symmetry axis.

When the optical detection system is constructed in this manner, it is permitted to obtain information which has hitherto been undetectable.

Further, if the material of the sample 10 contains asymmetric components (such as a minute material difference) with the configuration or structure thereof being symmetric, only the asymmetric components are directly produced as a difference output. To the contrary, if the configuration or structure of the sample 10 is asymmetric with the material thereof being symmetric, only the asymmetric components are outputted. It is therefore permitted by the present invention to analyze those characteristics of feeble light which have hitherto been buried in the unnecessary components and been indiscernible.

As described above, according to the present invention, the signals which have heretofore been difficult to be detected can be derived at the good SNR by the spatial difference detection. Accordingly, the precise information of the sample can be obtained, and the range of applications of a near-field optical microscope apparatus can be widened.

Figure 2:
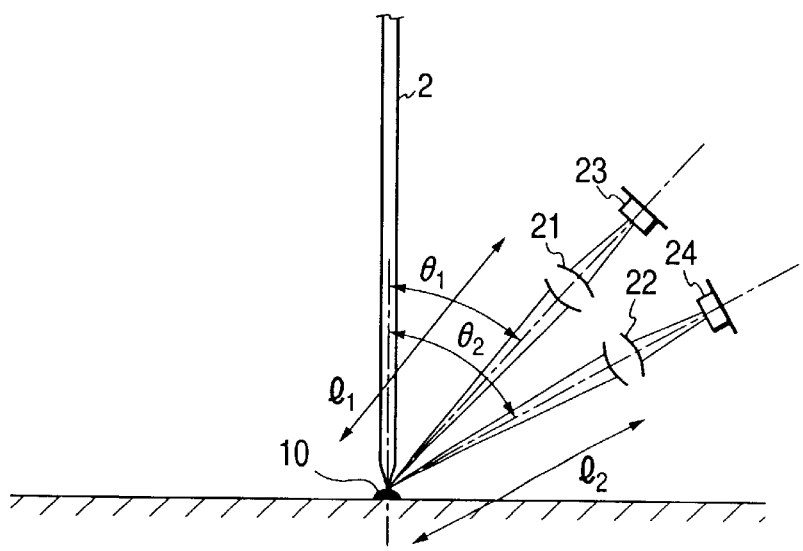
FIG. 2 is a schematic arrangement diagram showing the construction of the second embodiment of the present invention.

Embodiment 2:

FIG. 2 shows the construction of the optical detection system of a microscope in Embodiment 2 of the present invention.

This embodiment is so constructed that two optical detection subsystems are arranged adjacently on an identical side, not at the opposite side positions as in Embodiment 1. The constituents of the optical detection system having the same numerals and symbols as in Embodiment 1 shall be omitted from description.

Referring to FIG. 2, the first optical detection subsystem includes a photodetector or photosensor 23 and a sensor lens 21 arranged at a distance $l_1$ and an inclination angle $\theta_1$, while the second optical detection subsystem includes a photodetector 24 and a sensor lens 22 arranged at a distance $l_2$ and an inclination angle $\theta_2$. In this embodiment, $l_1=l_2$ holds and $(\theta_1-\theta_2)$ is very small. For this reason, the difference between the outputs of the first and second optical detection subsystems becomes an output produced by subjecting substantially the same scattered light to a spatial differentiation and an angular differentiation. Accordingly, the gradients of the spatial and angular distributions of a sample 10 can be directly found, and the minute spatial and angular distributions of the configuration or structure of the sample 10 or the material thereof can be detected at good SNRs.

In consequence, the resolving power of the microscope is heightened for finding the discrepancy between the gradient of the scattered light based on the minute distribution of the configuration or structure of the sample 10 and that of the scattered light based on inhomogeneity in the material in the microscopic region of the sample 10. Therefore, the analytical capability of the microscope for distinguishing the former from the latter is enhanced by the present invention.

As compared with Embodiment 1, this embodiment is suited to analyze the sample 10 having the minute spatial and angular distributions, rather than the sample 10 thought to be symmetric.

Figure 3:
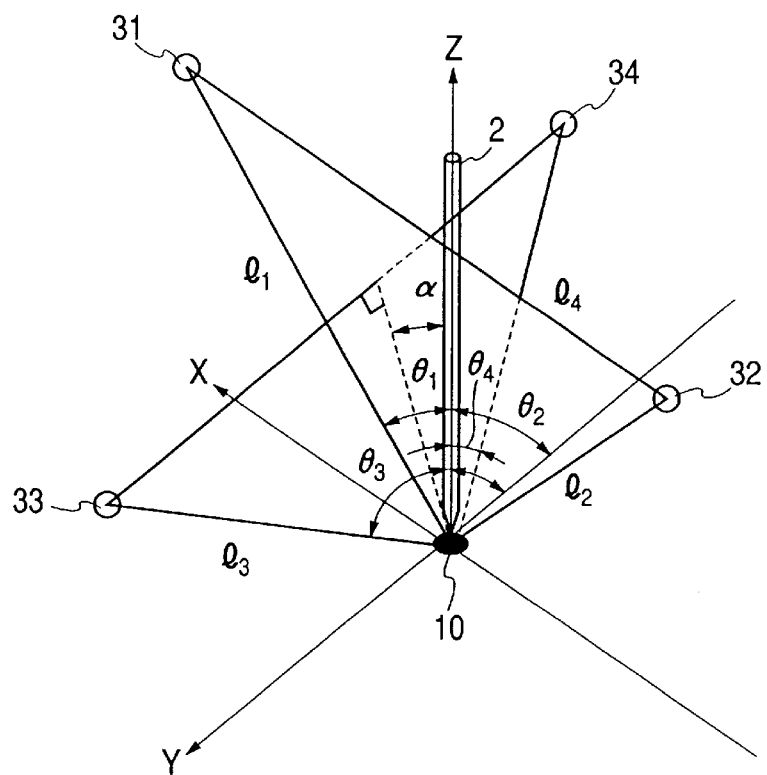
FIG. 3 is a schematic arrangement diagram showing the construction of the third embodiment of the present invention.

Embodiment 3:

FIG. 3 is a schematic arrangement diagram of the construction of the optical detection system of a microscope in Embodiment 3 of the present invention.

Unlike the foregoing embodiments, this embodiment has four photodetectors or photosensors arranged therein. The constituents of the optical detection system having the same numerals and symbols as in the foregoing embodiments shall be omitted from description.

Referring to FIG. 3, numerals 31, 32, 33 and 34 designate the photodetectors. Although the photodetectors may well be respectively furnished with sensor lenses as in the foregoing embodiments, the present invention can be performed even with the sole photodetectors each of which has an aperture equivalent to the pupil of the sensor lens. When such an optical detection system is employed, the number of components decreases, and also the number of portions to-be-adjusted decreases, so that reduction in cost is attained. The optical detection system, however, is less immune against stray light and a ghost image.

The photodetectors 31 and 32 are arranged at symmetric opposite-side positions within a ZX-plane under the conditions of distances $l_1=l_2$ and inclination angles $\theta_1=\theta_2$ as in Embodiment 1. The photodetectors 33 and 34 are arranged at opposite side positions symmetric relative to the ZX-plane, within a plane which is inclined an angle a relative to a YZ-plane. The distances of the photodetectors 33 and 34 are equal to those of the photodetectors 31 and 32 as expressed by $l_3=l_4=l_1$, but the inclination angles thereof are different from those of the photodetectors 31 and 32 as expressed by $\theta_3=\theta_4$. It is the same as in the foregoing embodiments that the optical detection subsystems are arrayed in centripetal fashion.

Figure 4:
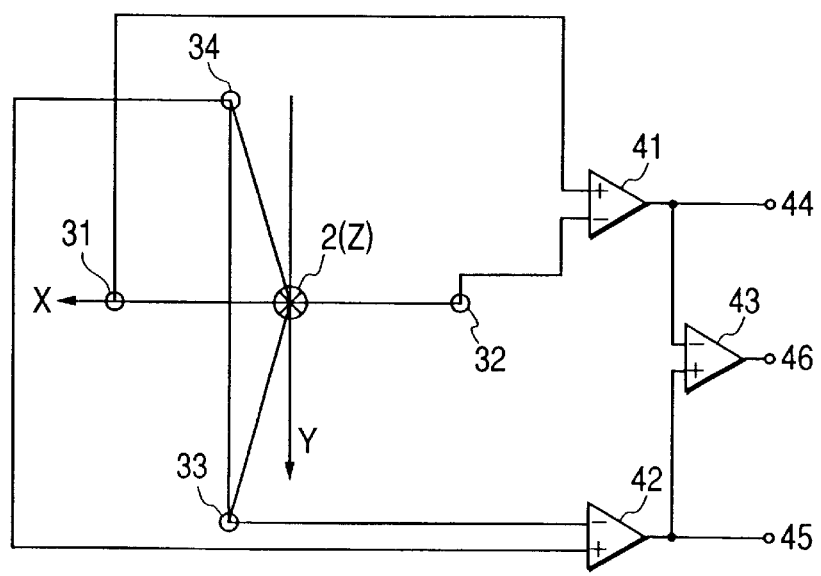
FIG. 4 is a schematic plan showing a state where an optical detection system in the third embodiment of the present invention is projected on an XY-plane.

FIG. 4 is a schematic plan showing the construction of the optical detection system in the third embodiment as is projected on an XY-plane.

Referring to the figure, the outputs of the photodetectors 31 and 32 arrayed symmetrically in an X-direction have their difference taken by a differential amplifier 41 included in a processor 11 not shown, whereby information 44 on balance in the X-direction is outputted. On the other hand, the outputs of the photodetectors 33 and 34 arrayed in a Y-direction have their difference similarly taken by a differential amplifier 42, whereby an output 45 is obtained. Herein, although the photodetectors 33 and 34 are arrayed symmetrically relative to the ZX-plane, their positions have the same X-directional components relative to the YZ-plane. Therefore, the output of the differential amplifier 42 is not the information on balance in the mere Y-direction, but it becomes the information 45 on oblique balance. Further, the differential output 46 between the outputs 44 and 45 (produced by a differential amplifier 43) becomes information on overall directional balance. Since the information 46 has the oblique component, the processing is equivalent to the shift of a balance point. It can accordingly be said that this embodiment offers the optimum arrayal in a case where a sample 10 is presupposed to have a directionality in the X-direction.

Thus, this embodiment indicates that the present invention can be optimized even for a directional sample. As understood from the fact, in a case where a sample has directionalities in a plurality of directions, the optical detection system can assume an arrangement of heightened detecting capability by increasing the number of detection subsystems in accordance with the number of the directions. It is accordingly obvious that the range of subjects to-be-analyzed is enlarged by the present invention.

Needless to say, even in a case where the directionalities of the sample lie in the elements of the configuration or structure and the material of this sample, the elements can be discerned by applying the technique explained before.

In the above description of the embodiments, the constructions and effects have been revealed as to the examples each having a small number of optical detection subsystems. In substance, however, the present invention shall not be restricted to the mere examples.

In addition, although signal processing is somewhat complicated, a detection component based on a differentiation can be enhanced by slightly shifting distances l or inclination angles θ from symmetric positions. It is the characterizing feature of the present invention that the optical detection system of a microscope can be optimized to the supposed spatial and angular gradients of the characteristics of a sample desired to be analyzed.

Besides, it is to be understood that the present invention is not restricted to the mere arrangement of optical detection subsystems at symmetric and opposite side positions, but that even the directionality or orientation of the characteristics of a sample or the direction of the ruggedness of a sample can be detected on the basis of information of shifting phase obtained from an optical detection subsystem arranged at the midpoint between the symmetric and opposite side positions.

What is claimed is:

1. A near-field optical microscope comprising:

an optical probe which is arranged in opposition to a sample, and which irradiates the sample with an evanescent wave;

first and second photodetectors arranged at symmetric positions about said optical probe, said first and second photodetectors detecting scattered light generated by scattering of the evanescent wave by the sample;

third and fourth photodetectors arranged at symmetric positions relative to a first direction in which said first and second photodetectors are aligned, within a first plane inclined at a predetermined angle relative to a second plane which is perpendicular to the first direction; and a processor which analyzes characteristics of the sample on the basis of a difference between detection signals of said first and second photodetectors.

2. A near-field optical microscope according to claim 1, wherein said processor analyzes characteristics of the sample on the basis of a difference between (i) the difference between detection signals of said first and second photodetectors and (ii) a difference between detection signals of said third and fourth photodetectors.

* * * * *

UNITED STATES PATENT AND TRADEMARK OFFICE
CERTIFICATE OF CORRECTION

PATENT NO.    : 6,433,327 B1                                          Page 1 of 1
DATED         : August 13, 2002
INVENTOR(S)   : Hiroaki Hoshi It is certified that error appears in the above-identified patent and that said Letters Patent is hereby corrected as shown below:

Title page,
Item [56], References Cited, FOREIGN PATENT DOCUMENTS
"3210407" should read -- 3-210407 --.

Column 3,
Line 2, "correspondent" should read -- corresponding --;
Line 15, "it is realized to detect" should read -- detection of --;
Line 17, "SNR." should read -- "SNR is realized. --;
Line 54, "to be" should read -- to --; and
Line 55, "detected" should read -- detect, --.

Column 4,
Line 8, "12 and" should read -- $l_2$ and --;
Line 19, "In consequence," should read -- Consequently, --;
Line 57, "an angle a" should read -- at a angle $\alpha$ --; and
Line 66, "is" should be deleted.

Column 5,
Line 37, "to the" should be deleted.

Signed and Sealed this

Fourth Day of February, 2003

JAMES E. ROGAN
*Director of the United States Patent and Trademark Office*